United States Patent
Derry

[11] 3,827,708
[45] Aug. 6, 1974

[54] PORTABLE PICNIC CART
[76] Inventor: Juanita Derry, 2009 W. Washington St., New Castle, Pa. 16101
[22] Filed: Aug. 23, 1973
[21] Appl. No.: 391,001

[52] U.S. Cl............................. 280/36 R, 280/36 B
[51] Int. Cl............................................. B62b 1/20
[58] Field of Search ........................ 280/36 B, 36 R

[56] References Cited
UNITED STATES PATENTS

| | | | |
|---|---|---|---|
| 2,972,488 | 2/1961 | Alsop | 280/36 B X |
| 3,007,709 | 11/1961 | Munson | 280/36 R |
| 3,173,704 | 3/1965 | Boudreau | 280/36 B |
| 3,326,570 | 6/1967 | Burnham et al. | 280/36 B |

Primary Examiner—M. Henson Wood, Jr.
Assistant Examiner—John J. Love
Attorney, Agent, or Firm—Webster B. Harpman

[57] ABSTRACT

A portable picnic cart includes a wheeled, foldable frame having a flexible carrier suspended therefrom and a removable chest, part of which is refrigerated, normally disposed therein. The top portion of the chest together with a pair of sidewardly extensible leaves form a table top and means on the wheeled foldable frame engage the removable chest when in position therein so that the chest holds the wheeled, foldable frame in upright position.

6 Claims, 5 Drawing Figures

PATENTED AUG 6 1974 3,827,708

PORTABLE PICNIC CART

BACKGROUND OF THE INVENTION

1. Field of the Invention:

This invention relates to a portable picnic cart in which a storage chest and a foldable wheeled frame therefore are combined.

2. Description of the Prior Art:

Prior structures of this type include a utility cart as seen in U.S. Pat. No. 2,613,951, a convertible baby carriage as seen in U.S. Pat. No. 2,616,719 and a stroller with a folding frame as seen in U.S. Pat. No. 3,110,504. No prior art is known wherein a picnic storage chest is located in and arranged to hold a supporting wheeled foldable frame in upright supporting position.

This invention provides a novel combination of a picnic chest and means for conveniently moving it to a desired location.

SUMMARY OF THE INVENTION

A portable picnic cart comprises a wheeled foldable frame having crossed and pivoted side arm assemblies resiliently mounted therein for supporting a flexible carrier in which a picnic chest is removably positioned and secured in a manner arranged to hold the wheeled folding frame in upright supporting position with respect thereto. The picnic chest is provided with top sections and sideward extensions to form a table top and includes a refrigerated food compartment as well as areas for the storage of plates, cups, saucers, etc., and food supplies.

DESCRIPTION OF THE DRAWINGS

FIG. 3 is an enlarged cross sectional elevation on line 3—3 of FIG. 2;

DESCRIPTION OF THE PREFERRED EMBODIMENT

Figure 1:
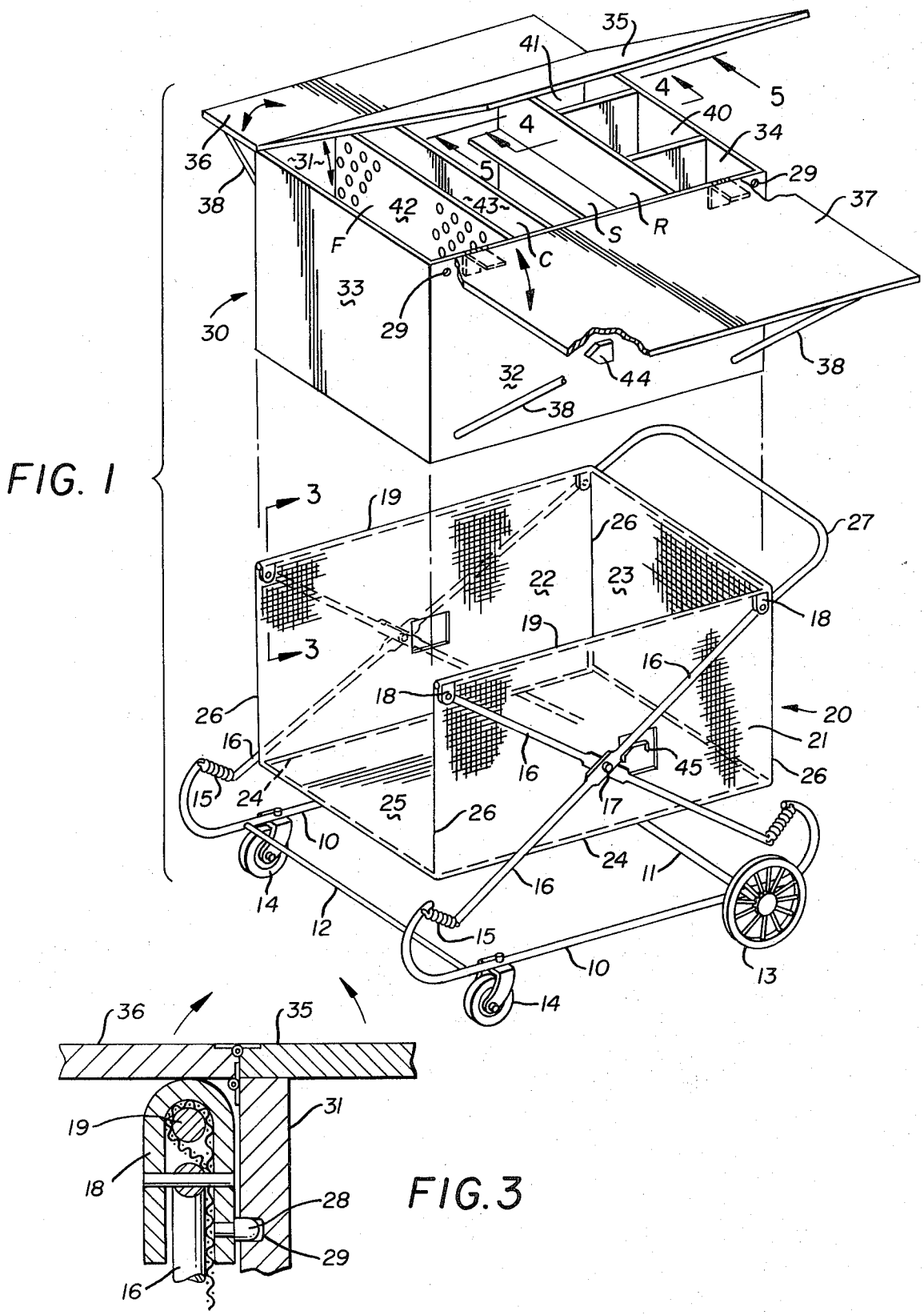
FIG. 1 is a composite expanded perspective elevation of the portable picnic cart.

In the form of the invention chosen for illustration and description herein the portable picnic cart consists of a wheeled folding frame having parallel spaced side frame members 10 with an interconnecting axle 11 and a transverse frame member 12 positioned therebetween. Wheels 13 are mounted on the opposite ends of the axle 11 and rotatable casters 14 are secured to the side frame members 10 adjacent the ends of the transverse frame member 12.

The opposite ends of the side frame members 10 are curved upwardly and inwardly and apertured for the reception of coil springs 15 which are also attached to the lower ends of a pair of crossed and pivoted arm assemblies 16. The crossed and pivoted arm assemblies 16 are pivoted to one another midway between their ends by pivots 17 and their uppermost ends are adapted to be retained in U-shaped brackets 18 which in turn are attached to and form a part of a secondary frame 19. The secondary frame 19 is horizontally disposed and U-shaped and has a flexible carrier 20 preferably formed of fabric suspended therefrom so as to form oppositely disposed side sections 21 and 22 and an end section 23. A rectangular frame 24 is secured to the lower edges of the side and end sections 21, 22 and 23 respectively and is provided with a flexible bottom section 25. The flexible carrier may comprise a suitable fabric hemmed along its edges and engaged over the frames 19 and 24. Reinforcing flexible corner sections 26 are provided to support the rectangular frame 24.

Still referring to FIG. 1 of the drawings, it will be seen that the wheeled folding frame and its flexible carrier just described will when in unfolded and erect position suitably support a picnic storage chest such as shown in the upper portion of FIG. 1. It will also be seen that the rearmost ends of the crossed and pivoted arms 16 are interconnected by a handle 27 outwardly of their frictional engagement with the U-shaped brackets 18 heretofore described and that the forward ends of the other pair of crossed and pivoted arms 16 are pivoted to the forward pair of U-shaped brackets 18.

By referring now to FIG. 3 of the drawings, it will be seen that each of the U-shaped brackets 18 has a sidewardly extending pin 28 thereon which is adapted to register in a matching opening 29 in each of the four corners of a storage chest 30 as illustrated in the top part of FIG. 1. The storage chest 30 is a rectangular box-like enclosure having opposite side walls 31 and 32 and end walls 33 and 34. A top closure 35 is hinged to the upper edge of the side wall 31 and a leaf 36 is also hinged thereto so as to extend outwardly therefrom and be foldable upwardly thereagainst. A second leaf 37 is hinged to the upper edge of the side wall 32 and both leaves 36 and 37 are provided with angularly disposed pivoted support members 38. It will be observed that the storage chest 30 is of a size and shape enabling it to fit downwardly within the flexible carrier 20 of the wheeled folding frame hereinbefore described and when in such position the pins 28 in the U-shaped brackets 18 engage the sockets 29 in the four corners thereof as hereinbefore described so that the storage chest 30 is held in position in the carrier 20 and at the same time prevents the collapse of the wheeled folding frame portion of the portable picnic cart.

Figure 2:
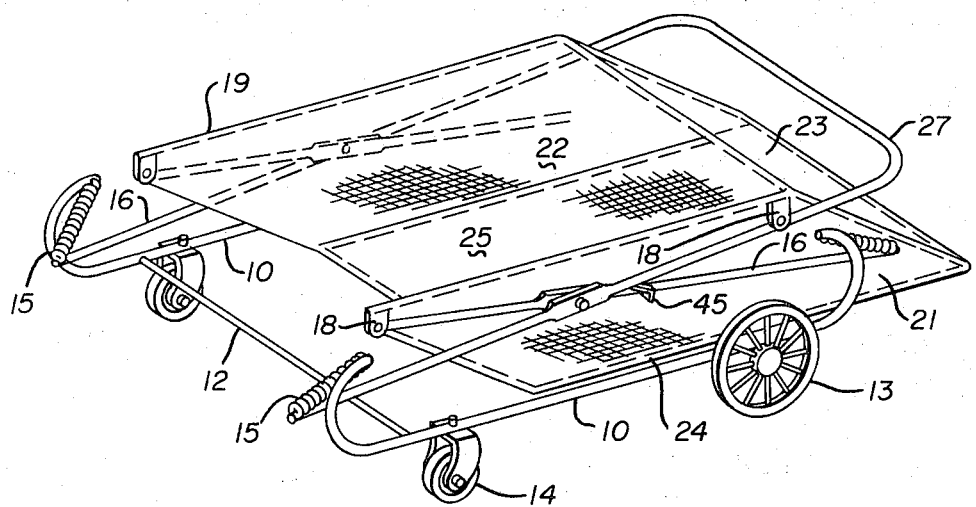
FIG. 2 is a perspective elevation of a portion of the picnic cart seen in FIG. 1 and showing the same in collapsed position.

By referring now to FIG. 2 of the drawings, the wheeled foldable frame of the portable picnic cart may be seen in collapsed or folded position and it will be observed that it forms a relatively small and compact shape which may be conveniently placed in the trunk of an automobile or the like.

Figures 4, 5:
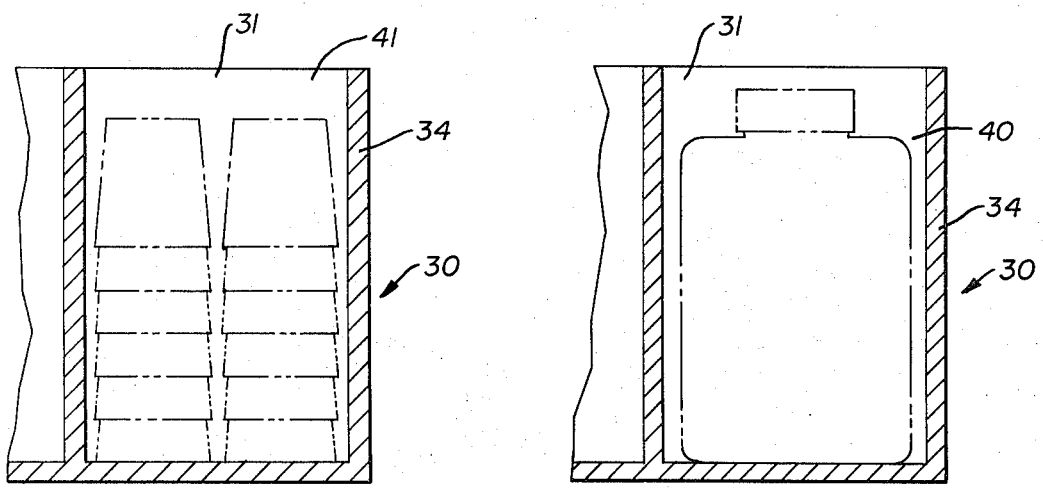
FIG. 4 is an enlarged horizontal section on line 4—4 of FIG. 1.
FIG. 5 is an enlarged horizontal section on line 5—5 of FIG. 1.

In FIG. 4 of the drawings, an enlarged cross section on line 4—4 of FIG. 1 illustrates the compartmentation of the storage chest 30 and illustrates a compartment 40 therein in which a thermos bottle or jug or the like may be positioned.

FIG. 5 of the drawings illustrates still another compartment 41 in the storage chest 30 in which glasses or the like may be positioned and by referring to FIG. 1 of the drawings and the upper portion thereof it will be observed that the opposite end of the storage chest 30 is provided with a perforated partition 42 and a closely spaced solid partition 43 parallel therewith so as to define a dry ice chamber C. Articles to be stored in frozen condition may be placed in a compartment F between the perforated partition 42 and the end 33 of the storage chest 30 which as understood by those skilled in the art is of insulated construction while articles to be kept in cold or refrigerated condition may be placed in a compartment R on the other side of the solid partition 43 which compartment R is cooled by conduction therethrough. A shelf S may be and preferably is provided in the compartment R.

Other configurations of the compartments of the storage chest 30 will occur to those skilled in the art and may obviously be employed and it will be seen that when the storage chest 30 is in position in the wheeled foldable frame and secured thereto by the registry of the pins 28 in the sockets 29 therein, the portable picnic cart may be wheeled from one location to another and if desired the top portion 35 and the leaves 36 and 37 thereof may be positioned to serve as a table.

In order that the storage chest 30 be safely and securely positioned in the wheeled folding frame portion of the portable picnic cart disclosed herein, secondary means is provided for cooperative relationship between the chest 30 and the crossed and pivoted arm assemblies 16 heretofore described.

By referring to FIG. 1 of the drawings and to the side 32 of the storage chest 30 it will be seen that there is a wedge-shaped block 44 thereon and a similar block is positioned on the other side. The block 44 is of a configuration and in a location to correspond with the opened shape of the arms 16 adjacent the pivots 17 therein and one of each of the pairs of crossed and pivoted arms 16 is provided with a matching bracket 45 which will engage the upper angular and horizontal portions of each of the blocks 44 when the storage chest 30 is positioned in the carrier 20 as by registry through window-like openings in the sides 21 and 22 of the flexible carrier.

It will thus be seen that in order to collapse the wheeled foldable frame so as to permit the same to move from the position shown in FIG. 1 of the drawings to that illustrated in FIG. 2 of the drawings it is necessary to spring the crossed and pivoted arm assemblies 16 slightly outwardly to disengage the members 45 from the blocks 44 whereupon the wheeled folding frame may be collapsed.

Although but one embodiment of the present invention has been illustrated and described, it will be apparent to those skilled in the art that various changes and modifications may be made therein without departing from the spirit of the invention.

Having thus described my invention what I claim is:

1. A portable picnic cart consisting of a wheeled foldable frame movable from upright to folded positions, a flexible carrier therein and a removable chest arranged to be positioned in said flexible carrier, means detachably securing said chest to said foldable frame, a top lid portion and leaves hinged to said chest and arranged to form a table top when in open position, and means on said chest engaging said foldable frame so as to prevent said foldable frame from folding when said foldable frame is in said upright position.

2. The portable picnic cart set forth in claim 1 and wherein said foldable frame consists of spaced parallel side frame members, interconnecting axle and a transverse frame member secured thereto, wheels on said axle and casters on said side frame members, a pair of crossed and pivoted arm assemblies resiliently connected at their lower ends to said side frame members, a frame, said flexible carrier engaged thereon and means on said frame engaging the upper ends of said pair of crossed and pivoted arm assemblies.

3. The portable picnic cart set forth in claim 1 and wherein a horizontally disposed U-shaped secondary frame suspends said flexible carrier in said wheeled foldable frame and wherein said secondary frame is detachably engaged in said wheeled foldable frame so as to be movable therewith from said upright to said folded positions.

4. The portable picnic cart set forth in claim 2 and wherein said spaced parallel side frame members have upwardly and inwardly extending end portions, coil springs connected to said end portions and to said pair of crossed and pivoted arm assemblies to form said resilient connection.

5. The portable picnic cart set forth in claim 1 and wherein said means on said chest engaging said foldable frame to prevent folding comprises wedgeshaped blocks on the opposite outer sides of the chest, crossed and pivoted arm assemblies forming parts of said foldable frame, said blocks registering adjacent the pivoted portions of said arm assemblies when said foldable frame is in upright position, brackets on said pivoted arm assemblies for engagement with said blocks arranged to prevent relative motion between said pivoted arm assemblies and said blocks.

6. The portable picnic cart set forth in claim 1 and wherein partitions in said chest form compartments therein, one of said partitions being apertured and spaced with respect to another of said partitions to form a refrigerant agent holding chamber.

* * * * *